United States Patent
Costa et al.

(10) Patent No.: US 10,211,737 B1
(45) Date of Patent: Feb. 19, 2019

(54) CONTROL OF SWITCHING REGULATOR

(71) Applicant: Infineon Technologies AG, Neubiberg (DE)

(72) Inventors: Pedro Costa, Munich (DE); Pablo Yelamos Ruiz, Hermosa Beach, CA (US)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/730,527

(22) Filed: Oct. 11, 2017

(51) Int. Cl.
*G05F 1/56* (2006.01)
*H02M 3/158* (2006.01)
*H02M 1/00* (2006.01)

(52) U.S. Cl.
CPC .. *H02M 3/1584* (2013.01); *H02M 2001/0045* (2013.01); *H02M 2001/0058* (2013.01); *H02M 2001/0083* (2013.01)

(58) Field of Classification Search
CPC ....... G05F 1/70; H02M 7/217; H02M 1/4225; H02M 3/157; H02M 2001/0054; Y02B 70/126
USPC ....... 323/205, 207, 222, 224, 282, 287, 288; 363/44, 82, 84, 89, 90, 21.04, 21.06, 363/21.08, 21.144, 902
See application file for complete search history.

(56) References Cited

U.S. PATENT DOCUMENTS

| | | | | |
|---|---|---|---|---|
| 6,177,782 B1* | 1/2001 | L'Hermite | .......... | H02M 1/4208 323/217 |
| 6,946,819 B2* | 9/2005 | Fagnani | .............. | H02M 1/4225 323/207 |
| 7,417,879 B2* | 8/2008 | Sawtell | ................. | H02M 3/156 323/222 |
| 7,888,881 B2* | 2/2011 | Shteynberg | ........ | H05B 33/0815 315/247 |
| 8,111,050 B2* | 2/2012 | Sutardja | .................... | G05F 1/70 323/207 |
| 8,723,498 B2* | 5/2014 | Siegler | ................ | H02M 1/4225 323/223 |
| 9,300,206 B2* | 3/2016 | Ye | ........................ | H02M 1/4225 |

* cited by examiner

*Primary Examiner* — Rajnikant Patel
(74) *Attorney, Agent, or Firm* — Shumaker & Sieffert, P.A.

(57) ABSTRACT

In some examples, a device includes control circuitry configured to receive a first input signal, receive a second input signal, and cause gate driver circuitry to deliver a driver signal to a switch to cause the switch to deliver electrical power to an electrical load. In some examples, the control circuitry is further configured to determine whether the first input signal has an active value and determine whether the second input signal has an active value. In some examples, the control circuitry is also configured to cause the gate driver circuitry to change the driver signal across a switching cycle of the switch to increase or decrease the electrical power delivered by the switch to the electrical load in response to determining that the first input signal has the active value or in response to determining that the second input signal has the active value.

20 Claims, 11 Drawing Sheets

CONTROL OF SWITCHING REGULATOR

TECHNICAL FIELD

This disclosure relates to control circuitry for power electronics.

BACKGROUND

Control circuitry may be configured to control a switch to deliver electrical power to an electrical load. The control circuitry may employ pulse-width modulation (PWM), phase-shift modulation, and/or pulse-frequency modulation (PFM) to control the electrical power that the switch delivers to the electrical load. For PWM, the control circuitry may vary the duty cycle, and for PFM, the control circuitry may vary the frequency. The control circuitry may be configured to determine the duty cycle, phase shift, and/or frequency based on information that the control circuitry receives from the switch, the power supply, or the electrical load.

SUMMARY

This disclosure describes techniques for changing a driver signal that gate driver circuitry delivers to a switch. Gate driver circuitry may be configured to change the driver signal to increase or decrease the electrical power delivered by the switch to the electrical load based on two input signals. When the first input signal has an active value, the control circuitry may be configured to cause the switch to increase the electrical power delivered to the electrical load. When the second input signal has an active value, the control circuitry may be configured to cause the switch to decrease the electrical power delivered to the electrical load.

In some examples, device includes control circuitry configured to receive a first input signal, receive a second input signal, and cause gate driver circuitry to deliver a driver signal to a switch to cause the switch to deliver electrical power to an electrical load. The control circuitry is also configured to determine whether the first input signal has an active value and cause the gate driver circuitry to change the driver signal across a switching cycle of the switch to increase the electrical power delivered by the switch to the electrical load in response to determining that the first input signal has the active value. The control circuitry is further configured to determine whether the second input signal has the active value and cause the gate driver circuitry to change the driver signal across the switching cycle of the switch to decrease the electrical power delivered by the switch to the electrical load in response to determining that the second input signal has the active value.

In some examples, a method includes receiving a first input signal, receiving a second input signal, and causing gate driver circuitry to deliver a driver signal to a switch to cause the switch to deliver electrical power to an electrical load. The method further includes determining that, in a first instance, the first input signal has an active value and changing the driver signal across a switching cycle of the switch to increase the electrical power delivered by the switch to the electrical load in response to determining that the first input signal has the active value. The method also includes determining that, in a second instance, the second input signal has the active value and changing the driver signal across the switching cycle of the switch to decrease the electrical power delivered by the switch to the electrical load in response to determining that the second input signal has the active value.

In some examples, a system includes a switch configured to deliver electrical power to an electrical load and gate driver circuitry configured to deliver a driver signal to a control terminal of the switch to cause the switch to deliver the electrical power to the electrical load. The system also includes control circuitry configured to receive a first input signal, receive a second input signal, and determine whether the first input signal has an active value. The control circuitry is also configured to cause the gate driver circuitry to change the driver signal across a switching cycle of the switch to increase the electrical power delivered by the switch to the electrical load in response to determining that the first input signal has the active value. The control circuitry is further configured to determine whether the second input signal has the active value and cause the gate driver circuitry to change the driver signal across the switching cycle of the switch to decrease the electrical power delivered by the switch to the electrical load in response to determining that the second input signal has the active value.

The details of one or more examples are set forth in the accompanying drawings and the description below. Other features, objects, and advantages will be apparent from the description and drawings, and from the claims.

DETAILED DESCRIPTION

Figure 1:
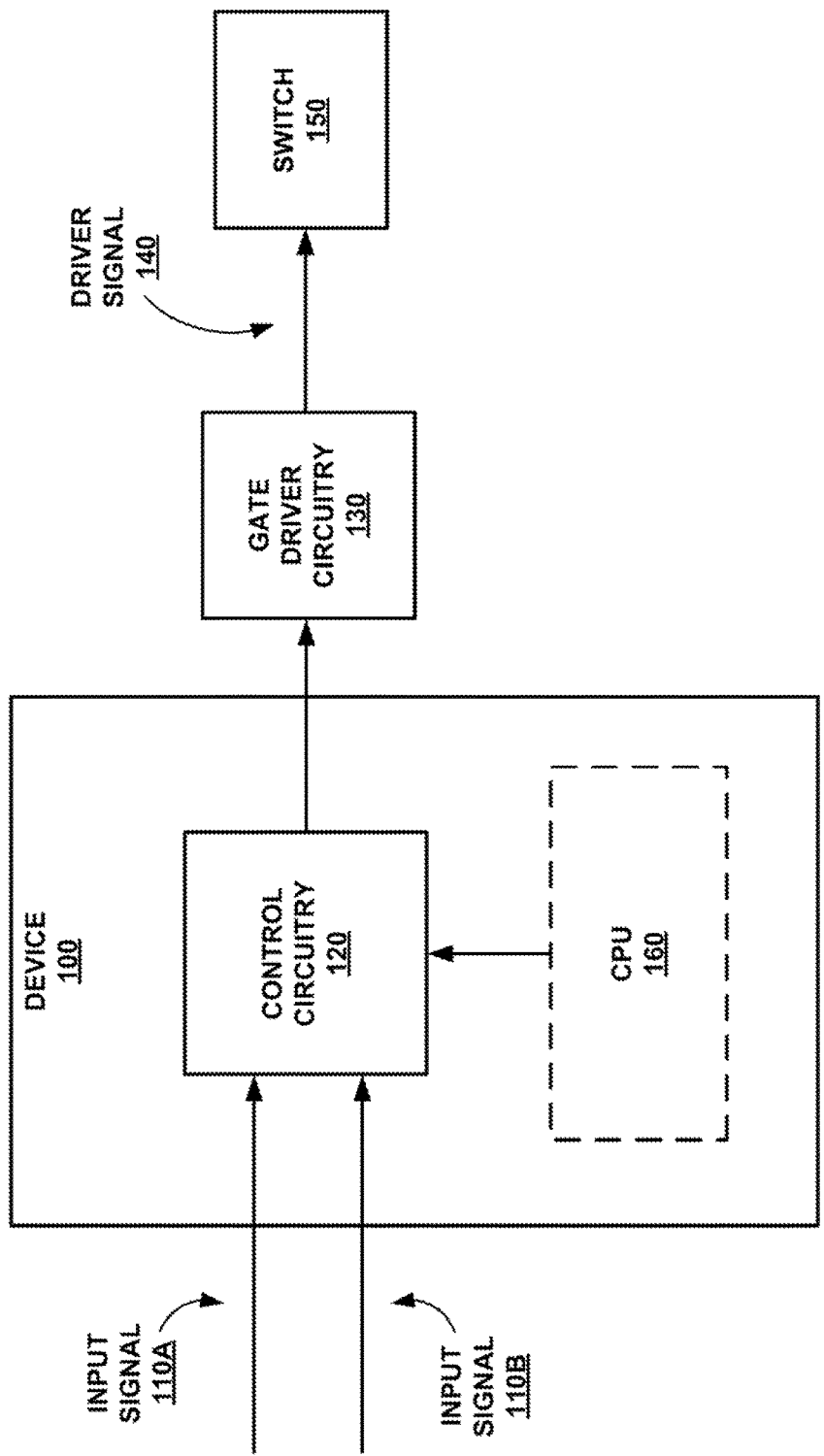
FIG. 1 is a conceptual block diagram of a device configured to cause gate driver circuitry to deliver a driver signal to a switch, in accordance with some examples of this disclosure.

This disclosure describes techniques for controlling a switch to deliver electrical power to an electrical load. The control of the switch may be based on a first input signal and a second input signal. An active value of the first input signal may result in controlling the switch to increase the electrical power delivered by the switch. An active value of the second input signal may result in controlling the switch to decrease the electrical power delivered by the switch. These techniques may be implemented in a device that includes gate driver circuitry configured to deliver a driver signal to the switch, or the gate driver circuitry may be located outside of the device. The device may also include control circuit configured to cause the gate driver circuitry to change the driver signal across a switching cycle of the switch.

In some examples, the control circuitry may be configured to cause the switch to deliver more or less electrical power by changing the on-time, duty cycle, frequency, and/or phase shift of the driver signal. The gate driver circuitry may be configured to change the on-time, duty cycle, frequency, and/or phase shift across multiple switching cycles. The control circuitry may be more efficient than existing controllers at controlling the electrical power that the switch delivers to the electrical load.

In some applications, a controller may evaluate control loop variables, such as currents or voltages, on a cycle-by-cycle basis. The controller may evaluate the control loop variables every switching cycle or every Nth switching cycle, where N is an integer greater than one. The processing resources of the controller may be configured to calculate the variables and determine new characteristics for the driver signal (on-time, duty cycle, frequency, and/or phase shift) every Nth switching cycle. More frequent calculations may consume more processing resources than less frequency calculations. Therefore, it may be more efficient and less expensive for the central processing unit (CPU) to perform calculations every fourth or fifth switching cycle, for example, as compared to performing calculations every single switching cycle. Instead, a dedicated hardware block may determine whether and by how much to change the parameters of a driver signal.

In some examples, the techniques of this disclosure may be used to control a direct-current-to-direct-current (DC/DC) regulator circuit or a switching regulator circuit. In a regulator circuit, the controller may be configured to monitor the voltage or current of the targeted converter in each pulse-width-modulation (PWM) switching cycle. The objective of the monitoring may be to maintain an accurate loop control (and therefore an accurate output voltage/current). It may be desirable in these applications to increase the PWM switching frequency in order to increase the efficiency of the regulator circuit and possibly decrease the size of the inductor. With higher switching frequencies, one can also decrease the overall footprint of the converter and inherently the overall cost—e.g. usage of gallium-nitride (GaN) switches.

By increasing the switching frequency, there is less time for the processing unit to calculate a new control loop variable in every single switching cycle. The processing unit may include a CPU in a microcontroller and/or a digital signal processor (DSP). The processing unit may use the variable(s) to control the amount of time that a switch or switches is conducting electricity. The amount of time that a switch or switches is conducting electricity may directly influence the efficiency and electrical specifications of the converter, especially when line steps or load steps are detected, or when an envelope needs to be tracked. The processing unit may control the amount of time that a switch is conducting electricity by controlling of the on-time, duty cycle, frequency, and/or phase shift of a driver signal delivered to the switch.

Therefore, the techniques of this disclosure may improve the efficiency/performance of a power converter circuit during the period of time when a CPU is performing variable calculation, such as a new proportional-integral-derivative (PID) value. The techniques of this disclosure may also allow relatively high switching frequencies and relatively precise control of the driver signal with relatively low processing power. A controller of this disclosure may be configured to operate at relatively high switching frequencies without expensive hardware, in terms of price, area, and development. Improving the efficiency may mean updating the amount of time that a switch is on or off via an automated means (e.g., without a CPU mechanism).

The high switching frequency of power electronics may cause two possible results. First, using an inexpensive controller may result in degraded responses to changes in the input voltage or the output voltage. The inexpensive controller may have relatively low processor frequency and processor capacity, such that the inexpensive controller may not be able to accurately determine a new driver signal for every switching cycle. Second, using a more expensive controller may allow for an accurate determination of a new driver signal for every switching cycle. The more expensive controller may have higher processor frequency and better processor capacity, but the cost of the controller may become an issue for some applications. A device of this disclosure may be relatively inexpensive and may provide more accurate control of the electrical power delivered by a switch. The device may control the electrical power delivered by the switch based on a dual-rail input that indicates whether the device should increase or decrease the electrical power.

One method involves the frequency and resources of the processing unit. This method, however, may increase the cost and power consumption of the processing unit. Another method involves a direct memory access controller configured to load new values into a peripheral unit that controls the on-times and off-times of the switch. This method may include additional constraints and efforts in terms of bus architectures and memory size, which may also increase the cost and power consumption of the processing unit.

The techniques of this disclosure include control circuitry configured to receive two input signals (e.g., a plus/minus dual-rail input). The dual-rail input may be built into the resource or resources that are controlling the amount of time that a switch is on or off. Analog circuitry may be configured to control the dual-rail input and to monitor some desired thresholds for the input signals. For example, in a controller, a timer may be configured to generate a PWM signal with a plus and minus input that will automatically increase or decrease the PWM duty cycle and/or PWM frequency with no intervention of the processor. The timer may also be configured to increase or decrease the PWM on-time and/or PWM phase shift.

If the control circuit includes a comparator to generate a PWM, the comparator may be configured to automatically increment or decrement the tripping reference, depending on the control input. The control input may be an internal monitor or an external monitor that determines whether a value is outside of a desired region. For example, the control circuitry may be configured to determine whether the amplitude of a target signal is greater than an upper threshold. If the amplitude of the target signal is greater than the upper threshold, then the control circuitry may be configured to increase the electrical power delivered by a switch. In contrast, if the control circuitry determines that the amplitude is less than a lower threshold, then the control circuitry may be configured to decrease the electrical power delivered by a switch.

The computation unit may be configured to compute the variables and operating conditions in the background. One main advantage is that the efficiency impact due to operating conditions change is minimized during the switching cycles where the new optimized values for the entire loop are calculated. Another advantage is that this plus/minus control method, can also be used to initiate the main computation loop (due to a change) and while this is handled by the CPU, the correction activities/actions are handled in parallel.

The proposed method may perform in a way that the CPU only controls the driver signal when the proposed automated control (e.g., the control circuitry) cannot reach the performance specifications or dynamics of the system. However, given a steady state of a system, such as a constant load of a switch-mode power supply (SMPS), the automated controller could ideally work alone for some periods of time. In other cases, the automated control would at least reduce the frequency at which the CPU re-calculates the control variable resulting in a less-loaded CPU and therefore a less expensive CPU. In some examples, the CPU may be configured to perform house-keeping functions that will bring down the overall cost of the system.

The control circuitry may be customizable with a programmable value of plus-minus, e.g., plus=+5 and minus=−5 (or any other numbers). Thus, the magnitude of increment or decrement may be adjusted based on the particular application. In addition, there may be several plus/minus pairs: plus[n=0]=+5, plus[n=1]=+3, etc. There may be several plus/minus input signals that can dictate +5 or +3, where each input signal causes an increment or decrement of differing magnitudes, for example offering non-lineal adjustments. There may be multiple differential pairs of input signals, such that the direction and gradient of change is based on which input signals have an active value. The magnitude of the increment or decrement may also be based on the amount of time that the input signal has had an active value.

An example use-case would be a power-factor-correction (PFC) stage where the control variable (e.g., input electrical current), needs to follow the input voltage which is a sinusoidal signal. The non-linearity of a sine waveform can be compensated with a smart selection plus/minus pairs (0, −5, −9, −9, −7, −3, 2, 7, 9, 9, 5, 0), which may provide a better fit of the control variable to the target waveform. Nevertheless, any of these upgrades is based in the same mechanism/method: at least a dual-rail input control signal that will in an automated way, increase or decrease a timer value or a comparator reference.

FIG. 1 is a conceptual block diagram of a device 100 configured to cause gate driver circuitry to deliver a driver signal 140 to a switch 150, in accordance with some examples of this disclosure. Device 100 includes control circuitry 120, gate driver circuitry 130, and optional CPU (e.g., processing circuitry). In some examples, gate driver circuitry 130 may be outside of device 100. Device 100 may be a controller configured to control the operation of a power conversion circuit, where switch 150 is part of the power conversion circuit. The power conversion circuit may include an AC-to-direct-current (AC/DC) conversion device, a DC/DC conversion device, a buck conversion circuit, a boost conversion circuit, a buck-boost conversion circuit, a forward conversion circuit, a resonant-mode conversion circuit, a half-bridge circuit, an H-bridge circuit, and/or any other power conversion circuit.

Control circuitry 120 may be configured to receive input signals 110A and 110B. Control circuitry 120 may be further configured to determine whether input signal 110A has an active value and determine whether input signal 110B has an active value. If input signals 110A and 110B are digital signals, the active value may be a high voltage level (e.g., a "one"), and an inactive value may be a low voltage level (e.g., a "zero"). Control circuitry 120 may include one or more comparators configured to determine whether each of input signals 110A and 110B has an active value by comparing the voltage level of input signal 110A or 110B to a reference voltage level. For example, if the active value and the inactive value of input signals 110A and 110B is three volts and zero volts, respectively, then the reference voltage level may be one volts or two volts.

Control circuitry 120 may also be configured to cause gate driver circuitry 130 to deliver driver signal 140 to switch 150. Control circuitry 120 may include a timer circuit and/or a comparator configured to cause gate driver circuitry 130 to deliver driver signal 140 as a PWM signal, a pulse-frequency-modulated (PFM) signal, and/or a pulse-density-modulated (PDM) signal. Control circuitry 120 may be configured to control the on-time, duty cycle, frequency, and/or phase shift of driver signal 140. Driver signal 140 may have one or more switching cycles, where each switching cycle includes a first interval when switch 150 conducts electricity (e.g. the on-time) and a second interval when switch 150 does not conduct electricity (e.g. the off-time).

In some examples, control circuitry 120 may be a separate element relative to CPU 160 of device 100. Control circuitry 120 may be configured to control the parameters or characteristics of driver signal 140 using circuitry such as comparators and/or timers. In some examples, control circuitry 120 may be configured to generate a lower-power control signal, and gate driver circuitry 130 may be configured to convert the lower-power control signal into driver signal 150 with higher power. Control circuitry 120 and gate driver circuitry 130 may be combined into a single integrated circuit or a single controller. Alternatively, control circuitry 120 and gate driver circuitry 130 may be built on separate circuits, chips, or devices. Similarly, CPU 160 may be integrated in device 100 or located in a device that is separate from device 100. Thus, control circuitry 120, gate driver circuitry 130, and CPU 160 may be integrated in one device, in three separate devices, or control circuitry 120 may be integrated with one of gate driver circuitry 130 or CPU 160 and separate from the other of gate driver circuitry 130 or CPU 160.

If device 100 includes optional CPU 160, CPU 160 may be configured to determine the optimized parameters of driver signal 140 every Nth switching cycle, where N is greater than one. CPU 160 may be configured to determine parameters such as frequency, duty cycle, and phase shift for driver signal 140 based on the electrical power that is delivered to an electrical load. CPU 160 may be configured to communicate the parameters of driver signal 140 to control circuitry 120, or CPU 160 may be configured to communicate the parameters directly to gate driver circuitry 130. Thus, control circuitry 120 may change the parameters of driver signal 140 during intervals between the parameter updates generated by CPU 160.

Switch 150 may be a power switch such as, but not limited to, any type of field-effect transistor (FET), a bipolar junction transistor (BJT), an insulated-gate bipolar transistor (IGBT), a high-electron-mobility transistor (HEMT), a gallium-nitride (GaN) based transistor, or another element that uses voltage for its control. Switch 150 may include an n-type transistor or a p-type transistor, and switch 150 may be a power transistor. In some examples, switch 150 may be a vertical transistor, a lateral transistor, and/or a horizontal transistor. In some examples, switch 150 may include another analog device such as a diode and/or a thyristor. Switch 150 may also include a freewheeling diode connected in parallel with a transistor to prevent reverse breakdown of switch 150.

Switch 150 may include three terminals: two load terminals and a control terminal. For a MOSFET switch, switch 150 may include a drain terminal, a source terminal, and at least one gate terminal, where the control terminal is a gate terminal. For BJT switches, control terminals may be base terminals. Current may flow between the load terminals of switch 150, based on the voltage at the control terminal, to an electrical load such as an electrical circuit, an electronic device, an electric motor, a light-producing device, a sound-producing device, and/or any other electrical load.

Switch 150 may include various material compounds, such as silicon (Si), silicon carbide (SiC), Gallium Nitride (GaN), or any other combination of one or more semiconductor materials. To take advantage of higher power density requirements in some circuits, power converters may operate at higher frequencies. In some examples, silicon carbide switches may experience lower switching power losses. Improvements in magnetics and faster switching, such as Gallium Nitride switches, may support higher frequency converters. These higher frequency circuits may require control signals to be sent with more precise timing, as compared to lower-frequency circuits. In some examples, device 100 may be configured to operate at switching frequencies of fifty kilohertz, one hundred kilohertz, two hundred kilohertz, and/or any other suitable frequency.

In accordance with the techniques of this disclosure, control circuitry 120 may be configured to cause gate driver circuitry 130 to change driver signal 140 across a switching cycle to change the electrical power delivered by switch 150 to an electrical load in response to determining that input signal 110A or 110B has an active value. For example, control circuitry 120 may be configured to increase the electrical power delivered by switch 150 to the electrical load in response to determining that input signal 110A has an active value. In order to increase the electrical power delivered by switch 150, control circuitry 120 may be configured to cause gate driver circuitry 130 to increase the on-time duty cycle of driver signal 140 or to decrease the frequency of driver signal 140.

Control circuitry 120 may be configured to decrease the electrical power delivered by switch 150 to the electrical load in response to determining that input signal 110B has an active value. In order to decrease the electrical power delivered by switch 150, control circuitry 120 may be configured to cause gate driver circuitry 130 to decrease the on-time duty cycle of driver signal 140 or to decrease the frequency of driver signal 140.

Control circuitry 120 may be configured to cause gate driver circuitry 130 to change driver signal 140 for a single switching cycle or across multiple switching cycles. For example, control circuitry 120 may be configured to cause gate driver circuitry 130 to increase a parameter of driver signal 140 (e.g., on-time, duty cycle, frequency, and/or phase shift) by increasing the parameter of driver signal 140 by a constant increment for each switching cycle of two or more switching cycles. A "constant increment" may be an increment that is equally applied to each switching cycle. If input signal 110A has an active value, control circuitry 120 may determine a duty cycle of forty percent for a first switching cycle, forty-two percent for a second switching cycle, forty-four percent for a third switching cycle, and so on. Control circuitry 120 may also be configured to apply an increment to a single switching cycle.

By increasing a parameter by a constant increment for two or more switching cycles, control circuitry 120 may use relatively simple circuitry and/or device 100 and CPU 160 may include fewer processing resources. Control circuitry 120 may be configured to change the parameters of driver signal 140 between the updates received from CPU 160. For example, CPU 160 may be configured to update the parameters of driver signal 140 every Nth switching cycle, where is N is greater than one. During the intervening switching cycles, control circuitry 120 may be configured to change the parameters of driver signal 140 based on input signals 110A and 110B. For example, if input signal 110A or 110B indicates that the electrical current flowing through switch 150 is higher than a threshold level, control circuitry 120 may be configured to decrease the on-time, frequency, and/or duty cycle of driver signal 140.

Figure 2:
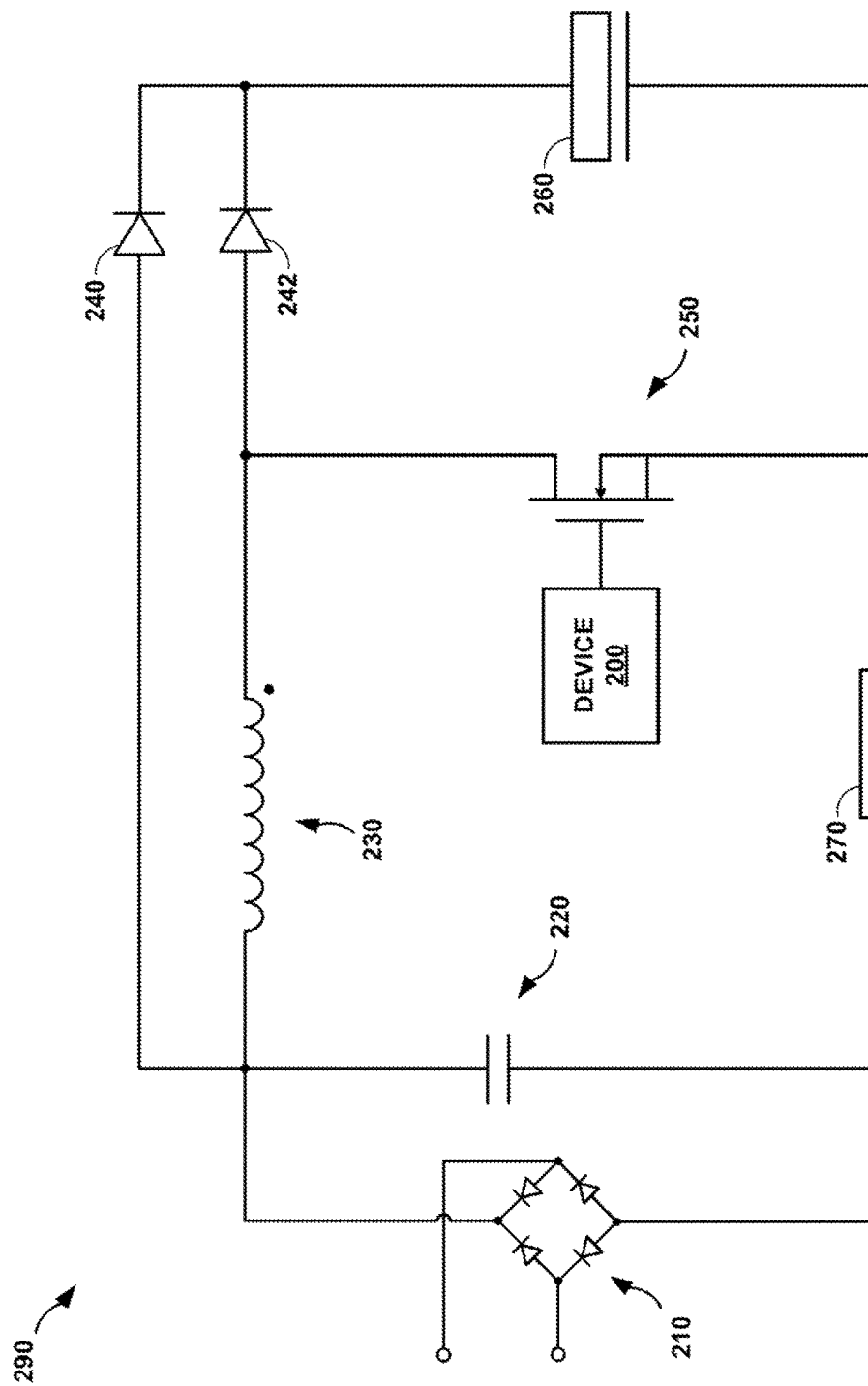
FIG. 2 is a circuit diagram of a power electronics system, in accordance with some examples of this disclosure.

FIG. 2 is a circuit diagram of a power electronics system 290, in accordance with some examples of this disclosure. Power electronics system 290 is just one example of a system with device 200 configured to control the operation of switch 250. Power electronics system 290 includes device 200, rectification circuitry 210, capacitor 220, inductor 230, diodes 240 and 242, switch 250, electrical load 260, and resistor 270. Device 200 may be configured to deliver a driver signal to switch 250. Device 200 may also be configured to control the electrical power that switch 250 delivers to electrical load 260 by at least controlling the on-time, duty cycle, frequency, and/or phase shift of the driver signal.

Rectification circuitry 210 may be configured to receive and rectify AC electricity from AC input. Rectification circuitry 210 may also be configured to deliver the rectified AC electricity to capacitor 220, inductor 230, and diode 240. Capacitor 220 may be configured to smooth the voltage level of the rectified AC electricity. In some examples, the rectified AC electricity may include half-wave rectified electricity and/or full-wave rectified electricity. However, the techniques of this disclosure may also apply to systems configured to receive DC electricity at the input.

As depicted in FIG. 2, when switch 250 is conducting electricity, diode 242 may not be conducting electricity. When switch 250 is conducting electricity, the electrical current through inductor 230 may increase and the energy stored in inductor 230 may increase. When switch 250 ceases conducting electricity, diode 242 may begin conducting electricity, the electrical current through inductor 230 may decrease, and the energy stored in inductor 230 may decrease. Resistor 270 may offer a return path for electricity that flows through switch 250 or through electrical load 260.

Device 200 may be configured to monitor the voltage across electrical load 260, the electrical current through electrical load 260, the voltage across switch 250, and/or the electrical current through switch 250. One or more of these voltage signals and/or current signals may be used to provide the two input signals to device 200. For example, when the voltage across electrical load 260 exceeds an upper threshold, a first comparator may cause an input signal to have an active value so that device 200 reduces the electrical power delivered to electrical load. When the voltage across electrical load 260 is less than a lower threshold, a second comparator may cause another input signal to have an active value so that device 200 increases the electrical power delivered to electrical load.

Figure 3:
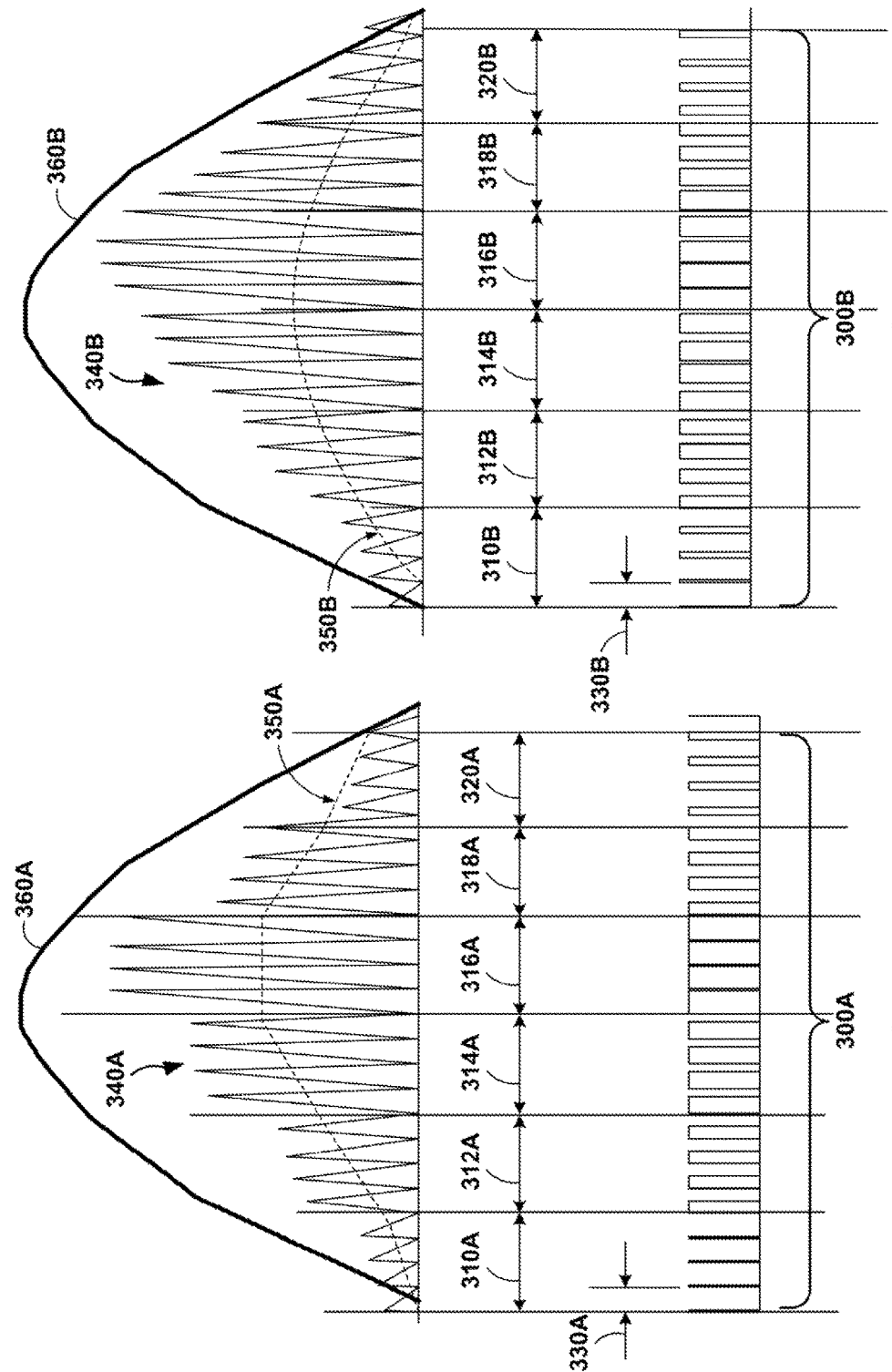
FIGS. 3A and 3B are graphs of driver signals across numerous switching cycles, in accordance with some examples of this disclosure.

FIGS. 3A and 3B are graphs of driver signals 300A and 300B across numerous switching cycles, in accordance with some examples of this disclosure. In some examples, a controller may deliver driver signals 300A or 300B to a switch used in PFC control. FIG. 3A depicts driver signals 300A and 300B as modulated digital signals (e.g., PWM signals) across twenty-four switching cycles. For example, FIG. 3A depicts driver signal 300A across intervals 310A, 312A, 314A, 316A, 318A, and 320A of four switching cycles each, and FIG. 3B depicts driver signal 300B is depicted across intervals 310B, 312B, 314B, 316B, 318B, and 320B of four switching cycles each.

Intervals 330A and 330B represent one switching cycle for each of driver signals 300A and 300B. Intervals 330A and 330B may be an initial switching cycle for intervals 310A and 310B. Each of the switching cycles for driver signals 300A and 300B may have a constant period or frequency across the twenty-four switching cycles depicted in FIGS. 3A and 3B. The duty cycle or on-time of driver signals 300A and 300B may change across switching cycles in order to change the electrical power delivered to an electrical load. In the example of driver signal 300A, the on-time for a switching cycle may equal the duty cycle multiplied by the time period of the switching cycle, where the time period may be constant across all of the switching cycles. For example, a duty cycle of fifty percent and a frequency of one hundred kilohertz may result in a time period of ten microseconds and an on-time of five microseconds. In some examples, the time period, frequency, and phase shift may also change across switching cycles.

Each of inductor currents 340A and 340B may represent an electrical current flowing through an inductor such as inductor 230 in FIG. 2. Each of average currents 350A and 350B may represent an average of electrical currents 340A and 340B. Voltage levels 360A and 360B may represent the AC input voltage level, such as the AC input voltage received by rectification circuitry 210 in FIG. 2.

A CPU for FIG. 3A may determine a first constant duty cycle and/or a first constant on-time for interval 310A. All four switching cycles of interval 310A may include the first constant duty cycle and/or the first constant on-time. The CPU may then determine a second constant duty cycle and/or a second constant on-time for interval 312A. All four switching cycles of interval 312A may include the second constant duty cycle and/or the second constant on-time.

In contrast to the CPU for FIG. 3A, a CPU for FIG. 3B may determine a first initial duty cycle and/or a first initial on-time for interval 310B. Interval 330B may include the first initial duty cycle and/or the first initial on-time, and the control circuitry for FIG. 3B may cause the duty cycle to increase for each of the remaining switching cycles of interval 310B based on an active value of an input signal. Thus, the duty cycle and on-time may not necessarily be constant across all of the switching cycles of interval 310B. The CPU for FIG. 3B may then determine a second initial duty cycle and/or a second initial on-time for interval 312B. The first switching cycle of interval 312B may include the second initial duty cycle and/or the second initial on-time, and the duty cycle may increase for each of the remaining switching cycles of interval 312B.

The CPU and control circuitry for FIG. 3B may produce a smoother average current 350B, as compared to average current 350A produced by the CPU for FIG. 3A. The CPU and control circuitry for FIG. 3B may be able to determine a tailored average current 350B to achieve higher precision, as compared to average current 350A. Therefore, the control circuitry and CPU for FIG. 3B may be more capable of causing a switch to deliver a desired level of electrical power to an electrical load, as compared to the CPU for FIG. 3A that only determines a constant duty cycles for each set of switching cycles (e.g., every four switching cycles). The control circuitry for FIG. 3B may change the parameters of driver signal 300B for the intervening switching cycles between updates from the CPU. The control circuitry for FIG. 3B may achieve a better quality of electrical power (e.g., better shaping and better fit) than the CPU for FIG. 3A. The electrical power delivered in FIG. 3B may have better current total harmonic distortion (iTHD) and power factor (PF) figures of merit, than the electrical power delivered in FIG. 3A.

Figure 4:
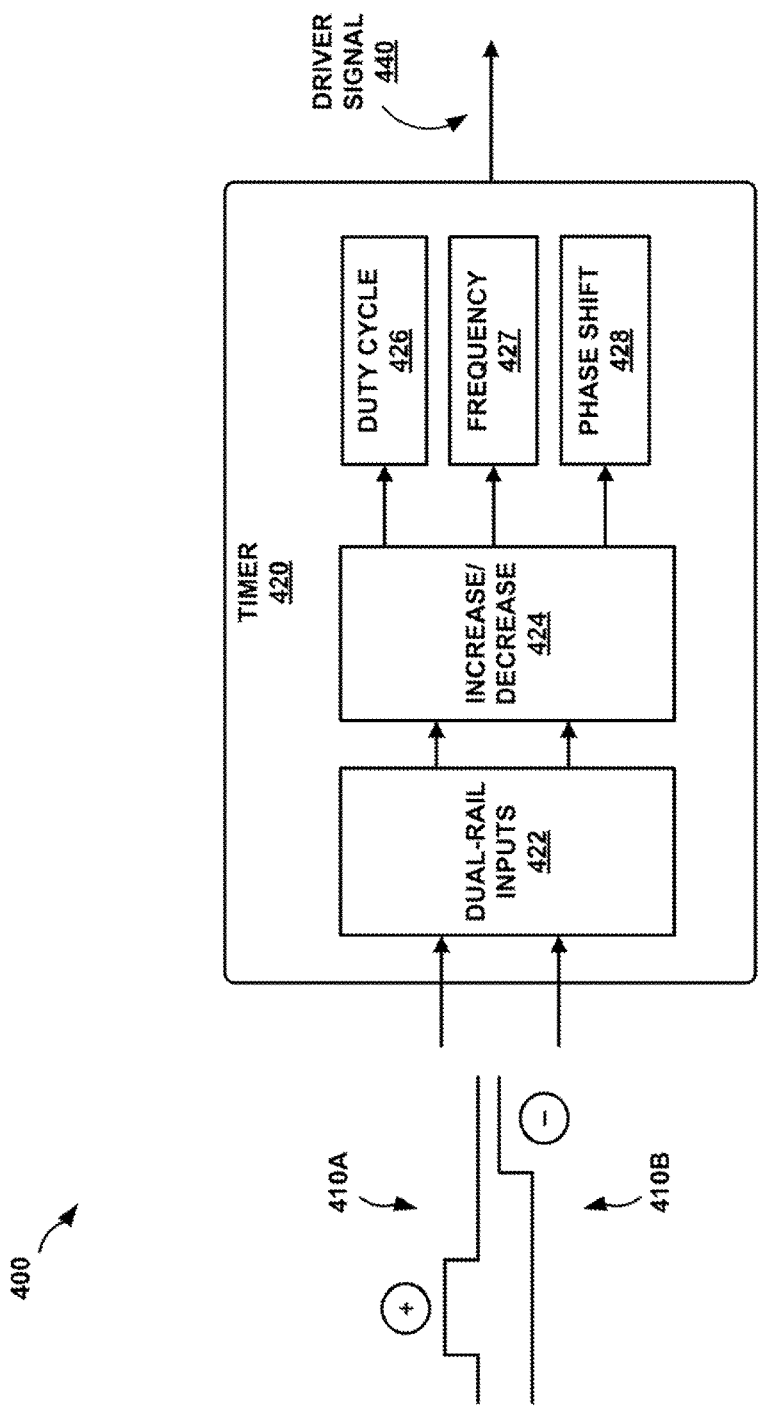
FIG. 4 is a conceptual block diagram of a timer configured to determine characteristics of a driver signal, in accordance with some examples of this disclosure.

FIG. 4 is a conceptual block diagram of a timer 420 configured to determine parameters of a driver signal 440, in accordance with some examples of this disclosure. Device 400 includes timer 420 as one example of control circuitry that is configured to cause gate driver circuitry (not shown in FIG. 4) to generate driver signal 440. Timer 420 may be configured to count processor cycles to determine the on-time and time period of driver signal 440. Timer 420 is one example of control circuitry 120 in FIG. 1.

Dual-rail inputs module 422 may be configured to receive input signals 410A and 410B. When input signal 410A has an active value, as indicated by the plus icon in FIG. 4, increase/decrease module 424 may be configured to increase the electrical power delivered by a switch by causing the gate driver circuitry to change a parameter of driver signal 440, such as the duty cycle, frequency, time period, on-time, and/or phase shift. When input signal 410B has an active value, as indicated by the minus icon in FIG. 4, increase/decrease module 424 may be configured to decrease the electrical power delivered by the switch by causing the gate driver circuitry to change a parameter of driver signal 440, such as the duty cycle, frequency, time period, on-time, and/or phase shift.

For example, the frequency of a computation cycle of device 400 may be on the order of approximately eight megahertz, the switching cycle of driver signal 440 may be on the order of one hundred kilohertz, and the duty cycle of driver signal 440 may be approximately fifty percent. Thus, in this example, the on-time of driver signal 440 may be forty computation cycles, and the time period of driver signal 440 may be eighty computation cycles. To increase the electrical power delivered by a switch, duty cycle module 426 may be configured to increase the on-time of driver signal 440 by increasing the number of computation cycles for the on-time. To increase the electrical power delivered by the switch, frequency module 427 may be configured to decrease the time period of driver signal 440 by decreasing the number of computation cycles for the time period. In some examples, frequency module 427 may be configured to hold the on-time at a constant number while increasing or decreasing the time period.

To increase the electrical power delivered by the switch, phase shift module 426 may be configured to increase the phase shift of driver signal 440 by changing the number of computation cycles for the time period. For example, timer 420 may be configured to deliver two driver signals to the switches of an H-bridge circuit. Timer 420 may be configured to increase the phase shift of the two driver signals by decreasing the overlap of the on-time of the driver signals. Depending on other variables, an increased phase shift may lead to more or less electrical power being delivered to an electrical load.

In some examples, timer 420 may be configured to deliver a control signal to gate driver circuitry to generate driver signal 440 that has higher power than the control signal. The gate driver circuitry may be configured to drive a power switch that has relatively high internal capacitance, as compared to a transistor in a digital logic device. Device 400 may also include a CPU configured to determine the parameters of driver signal 440 every Nth switching cycle, where N is greater than one. During the switching cycles between CPU updates, timer 420 may be configured to change one or more of the parameters of driver signal 440.

Figure 5:
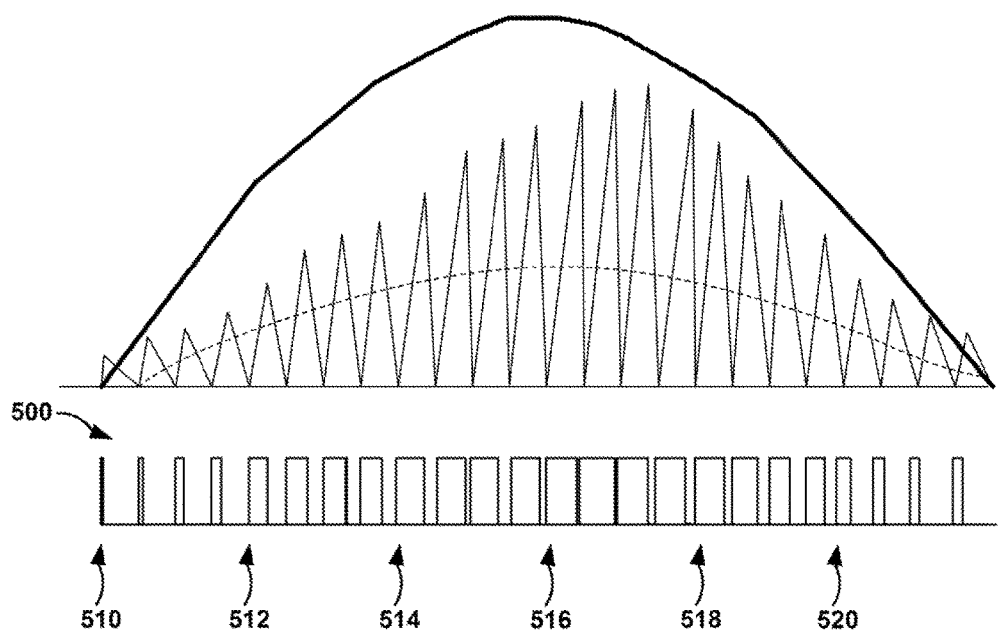
FIG. 5 is a graph of a driver signal across numerous switching cycles, in accordance with some examples of this disclosure.
Figure 6:
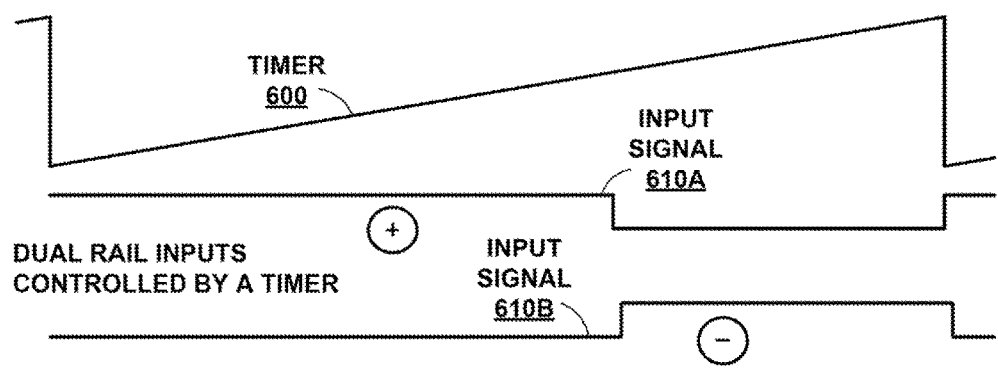
FIG. 6 illustrates a timer signal and two input signals, in accordance with some examples of this disclosure.

FIG. 5 is a graph of a driver signal 500 across numerous switching cycles, in accordance with some examples of this disclosure. FIG. 6 illustrates a timer signal 600 and two input signals 610A and 610B, in accordance with some examples of this disclosure. The duty cycle of driver signal 500 may increase across intervals 510, 512, and 514 and at least part of interval 516 when input signal 610A has an active value. The duty cycle of driver signal 500 may decrease across intervals 518 and 520 when input signal 610B has an active value.

Timer signal 600 may control input signals 610A and 610B. In some examples, when the level of timer signal 600 is less than threshold level 620, input signal 610A may have an active value. When the level of timer signal 600 is greater than threshold level 620, input signal 610B may have an active value. The duty cycle of driver signal 500 may increase from zero before interval 510 to a peak value near one hundred percent in interval 516. The duty cycle of driver signal 500 may then decrease towards zero percent by interval 520. In some examples, driver signal 500 may controlled by other means, such as comparator(s) and/or analog-to-digital converter flag(s), in addition to or in the alternative to control by timer signal 600. A CPU may be configured to determine the duty cycle of driver signal 500 every four switching cycles (e.g., corresponding to intervals 510, 512, 514, 516, 518, and 520), for example. Control circuitry may be configured to change the duty cycle of driver signal 500 every switching cycle based on input signals 610A and 610B.

In some examples, both of input signals 610A and 610B may simultaneously have active values. The control circuitry may be configured to treat simultaneous active values in several ways. First, the control circuitry may be configured to treat the simultaneous active values as simultaneous inactive values and not increase or decrease the electrical power delivered to the electrical load. Second, the control circuitry may be configured to give priority to the input signal that achieved an active value first by ignoring the input signal that achieved an active value last. Third, the control circuitry may be configured to give priority to the input signal that achieved an active value later by ignoring the input signal that achieved an active value first.

Figure 7:
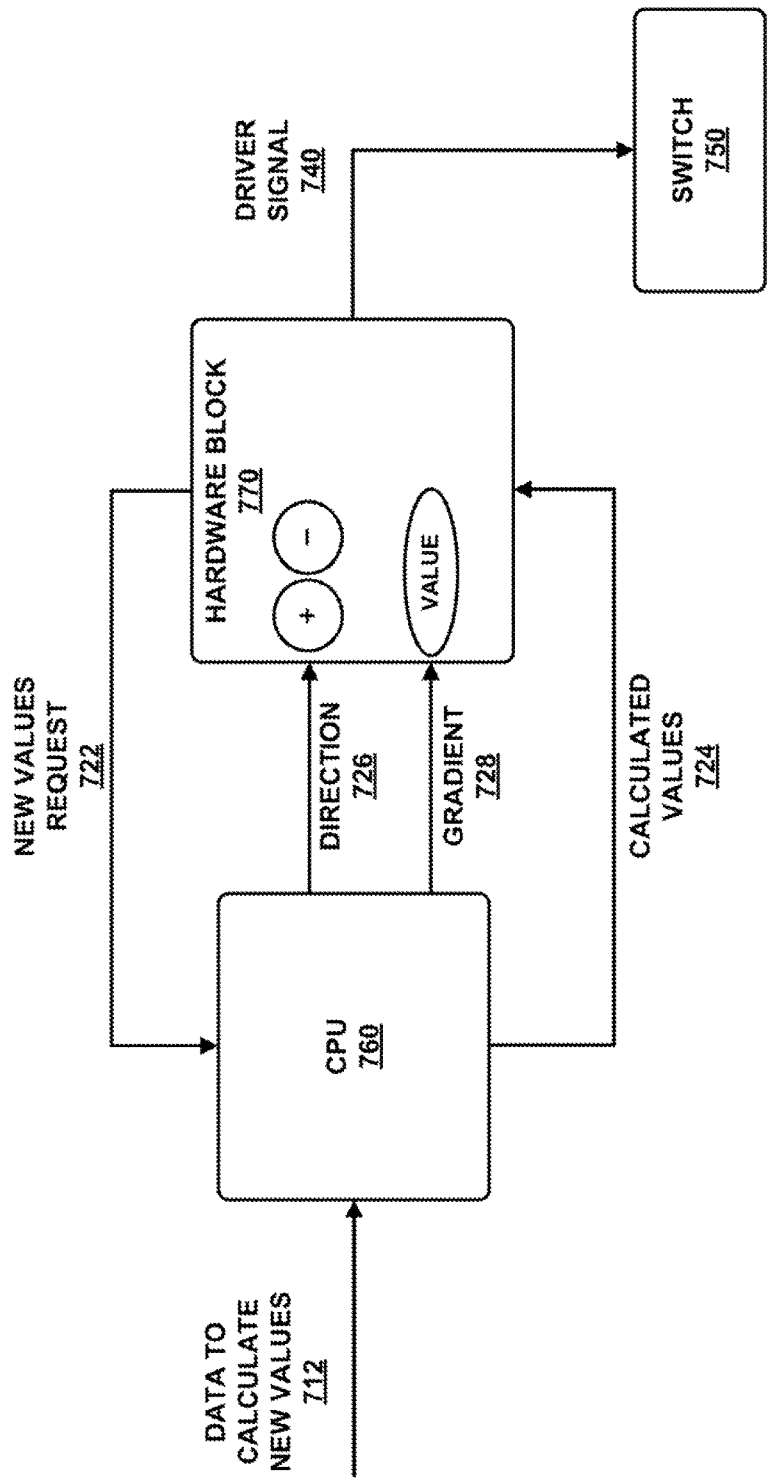
FIGS. 7 and 8 are conceptual block diagrams of a CPU and a hardware block configured to generate an output signal, in accordance with some examples of this disclosure.
Figure 8:
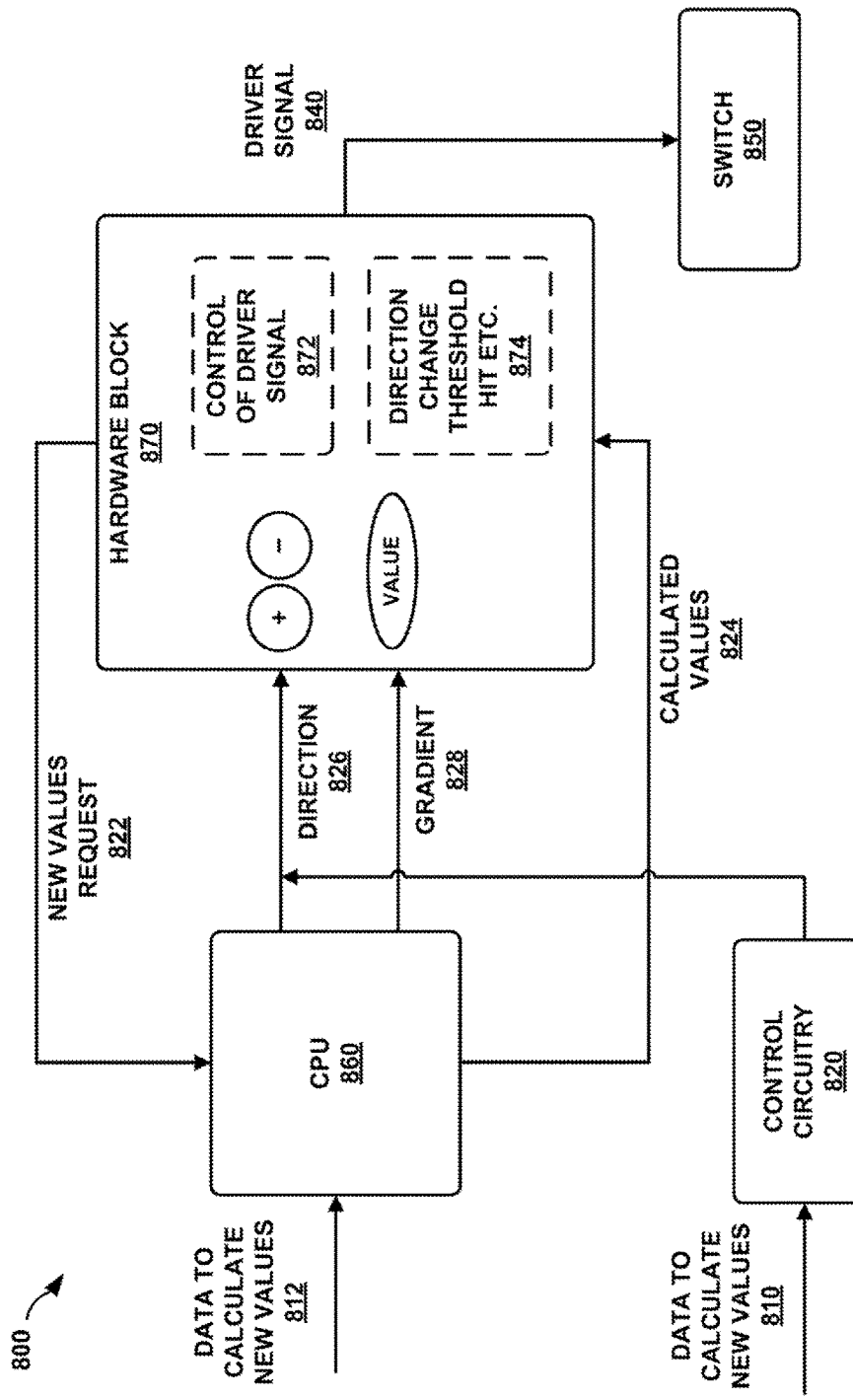

FIGS. 7 and 8 are conceptual block diagrams of a CPU and a hardware block configured to generate an output signal, in accordance with some examples of this disclosure. CPUs 760 and 860 may be programmed with software and/or firmware and may include other components such as memory. In the example of FIG. 7, CPU 760 may be configured to receive data 712 and determine new values 724 of the parameters of a driver signal. Data 712 may include voltage or current levels at switch 750 and/or an electrical load. Data 712 may also include an input voltage (e.g., the voltage across capacitor 220 in FIG. 2). New values 724 may include parameters such as the duty cycle, frequency, and/or phase shift of the driver signal.

CPU 760 may also be configured to determine direction 726 and gradient 728 for one or more of the parameters of the driver signal. For example, direction 726 may indicate an increase in the duty cycle, and gradient 728 may indicate the magnitude of increase in the duty cycle across one or more switching cycles. Gradient 728 may indicate an increase of two percent per switching cycle, such that the duty cycle of the driver signal increases from fifty percent to fifty-eight percent across an interval of five switching cycles.

Hardware block 770 may be configured to receive calculated values 724, direction 726, and gradient 728. Hardware block 770 may be further configured to deliver driver signal 740 to switch 750. Hardware block 770 may also be configured to send a signal to integrated or external gate driver circuitry, the gate driver circuitry may generate driver signal 740. Switch 750 may be a switch configured to deliver electrical power to an electrical load based on driver signal 740. Switch 750 may also include gate driver circuitry configured to generate a driver signal based on driver signal 740. In some examples, hardware blocks 770 and 870 may be configured to deliver an output signal to an external component. The output signal may be a control signal, and the external component may be gate driver circuitry configured to generate a driver signal for a switch.

In the example of FIG. 8, control circuitry 820 may be configured to receive data 810 and generate input signals for hardware block 870. For example, control circuitry 820 may be configured to generate a dual-rail input for direction 826 and/or gradient 828. Control circuitry 820 may lighten the load of CPU 860 by generating the direction signal 826 for hardware block 870. Thus, CPU 860 may have a slower processing speed and/or less processing capacity, as compared to other devices, in order to save on cost. However, device 800 may still perform as well as more expensive devices with higher CPU speed and higher CPU capacity because control circuitry 820 may be configured to control direction signal 826 for every switching cycle or every other switching cycle, which may be more frequent than CPU 860 can update the parameters of driver signal 840.

Hardware block 870 may include control module 872 for determining the parameters of driver signal 840. Hardware block 870 may include threshold module 874 for determining whether direction signal 826 has reached a threshold level. For example, if direction signal 826 quickly changes values (e.g., indicates a direction and then suddenly reversing), threshold module 874 may cause hardware block 870 to not change the parameters of output signal 840 in response to the changes in direction signal 826. Threshold module 874 may be configured to ignore high-frequency changes in direction signal 826 by using a timer circuit, a capacitor, and/or any other means for filtering high-frequency signals.

CPUs 760 and 860 may include processing circuitry configured to execute instructions, such as software or firmware, to generate values 724, direction 726, and gradient 728. CPUs 760 and 860 may be implemented, at least in part, in hardware, software, firmware, or any combination thereof. For example, CPUs 760 and 860 may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

CPUs 760 and 860 may also be embodied or encoded in an article of manufacture including a computer-readable storage medium encoded with instructions. Instructions embedded or encoded in an article of manufacture including a computer-readable storage medium encoded with instructions, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Figure 9:
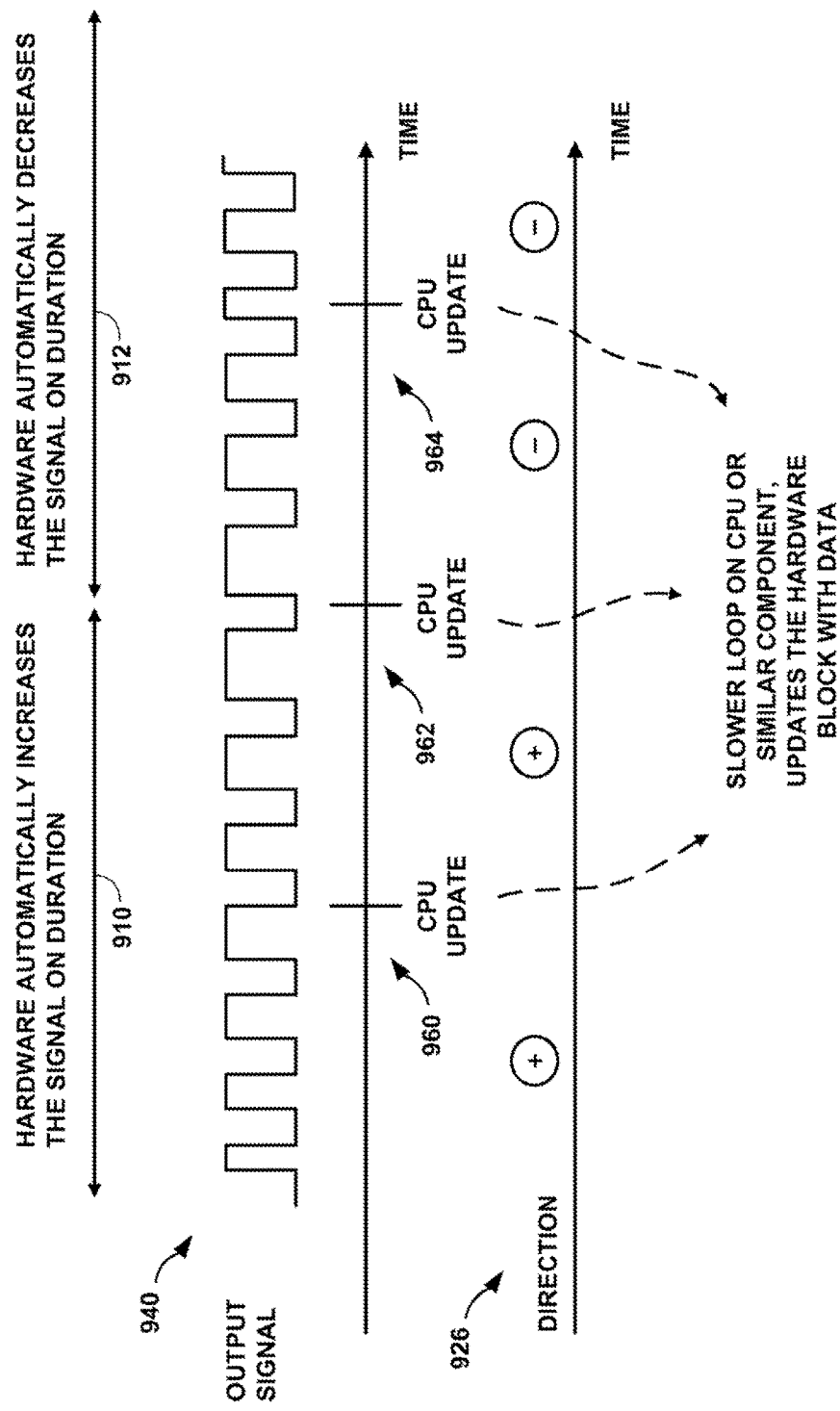
FIG. 9 is a graph of a driver signal with increasing and decreasing on-times, in accordance with some examples of this disclosure.

FIG. 9 is a graph of a driver signal 940 with increasing and decreasing on-times, in accordance with some examples of this disclosure. In response to direction signal 926, the hardware (e.g., control circuitry) may be configured to automatically increase the on-time of driver signal 940 during interval 910. In response to direction signal 926, the hardware may be configured to automatically decrease the on-time of driver signal 940 during interval 912. The CPU may be configured to determine the parameters of driver signal 940 at CPU updates 960, 962, and 964. During the intervening switching cycles between CPU updates 960, 962, and 964, the control circuitry may be configured to change the one or more of the parameters of driver signal 940.

At CPU update 960, for example, the CPU may determine a duty cycle of sixty percent. The control circuitry may determine that the duty cycle will increase across one or more switching cycles based on direction signal 926. Thus, the duty cycle of driver signal 940 may increase for the next four switching cycles as the first input signal maintains an active value. At CPU update 962 the CPU may determine a duty cycle of seventy-five percent. The control circuitry may determine that the duty cycle will decrease across one or more switching cycles based on direction signal 926. The allocation between the CPU and the control circuitry may allow for a less expensive CPU while maintaining performance that is comparable to more expensive controllers. The CPU may also have lower power consumption and lower direct memory access usage.

In the example of FIG. 9, the CPU may be configured to update the on-time of driver signal 940 every four switching cycles. In some examples, the CPU updates may be more or less frequent. The CPU may have a slower loop to determine the new parameters value of duty cycle, frequency, on-time, etc., as compared to the control circuitry. For example, the CPU may not be fast enough to determine the new parameters for each switching cycle, which may occur every fifty or one hundred processor clock cycles. The control circuitry may be able to more quickly respond to changes in the input signals, as shown by direction signal 926, to change the parameters of driver signal 940. The control circuitry may be configured to change the parameters of driver signal 940 every switching cycle or every Nth switching cycle, where N is greater than one, especially if the switching frequency is fast.

Figure 10:
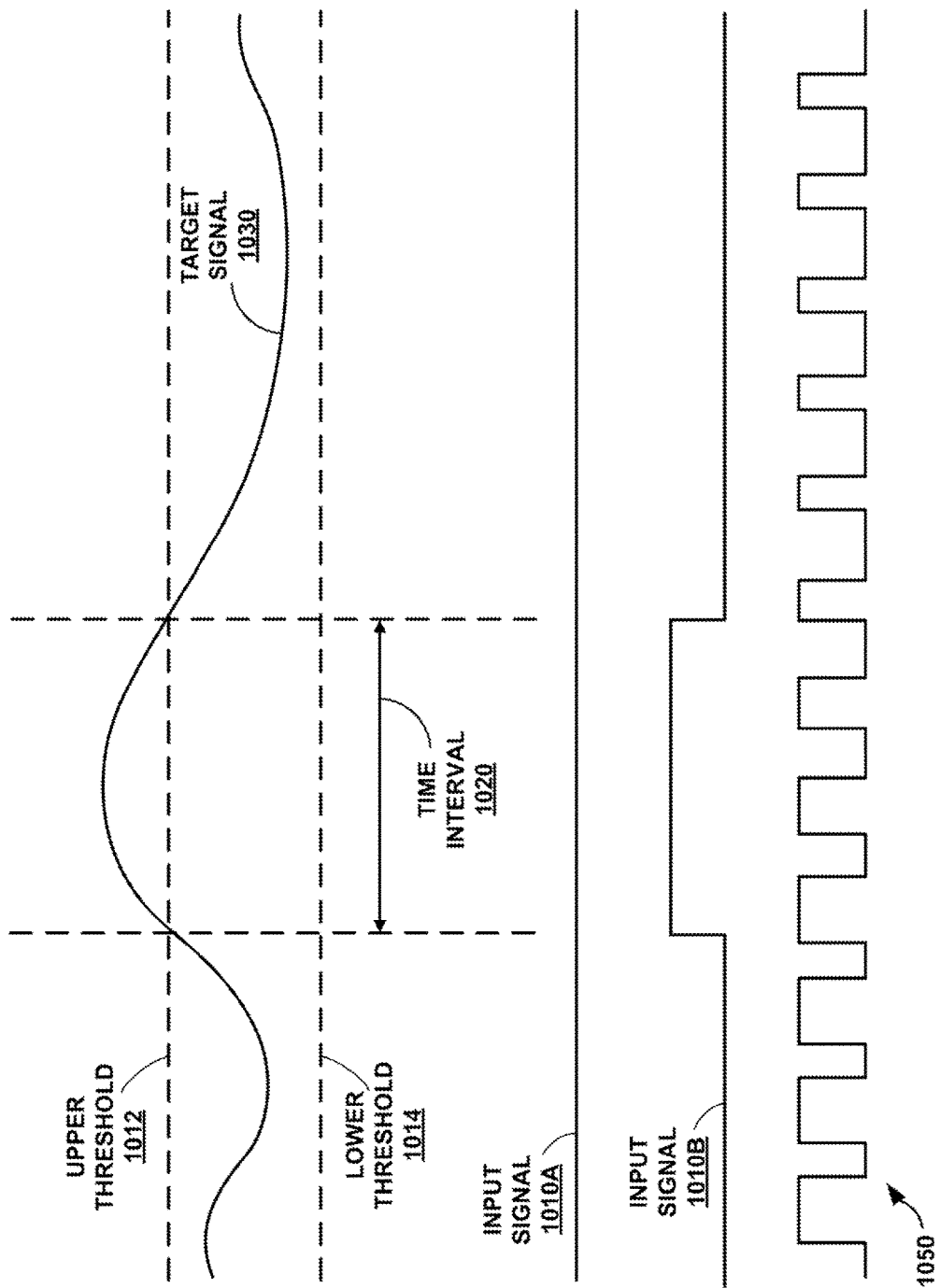
FIG. 10 illustrates graphs of a target signal, input signals, and a driver signal across several switching cycles, in accordance with some examples of this disclosure.

FIG. 10 illustrates graphs of a target signal 1030, input signals 1010A and 1010B, and a driver signal 1050 across several switching cycles, in accordance with some examples of this disclosure. Target signal 1030 may indicate the voltage drop across an electrical load, the electrical current through an electrical load, the voltage drop across a switch, the electrical current through a switch, and/or any other electrical signal of interest. Target signal 1030 may stay between threshold levels 1012 and 1014, except for time interval 1020, when the amplitude of target signal 1030 exceeds upper threshold 1012.

When target signal 1030 exceeds upper threshold 1012, input signal 1010B may have an active value, causing the control circuitry to reduce the duty cycle and on-time of driver signal 1050. The control circuitry may be configured to decrease the duty cycle for each switching cycle that input signal 1010B has an active value. During the time interval 1020, the control circuitry may be configured to decrease the duty cycle of driver signal 1050 by a constant decrement in each switching cycle. The control circuitry may then be configured to hold the duty cycle constant after time interval 1020 when neither of input signal 1010A or 1010B has an active value.

Figure 11:
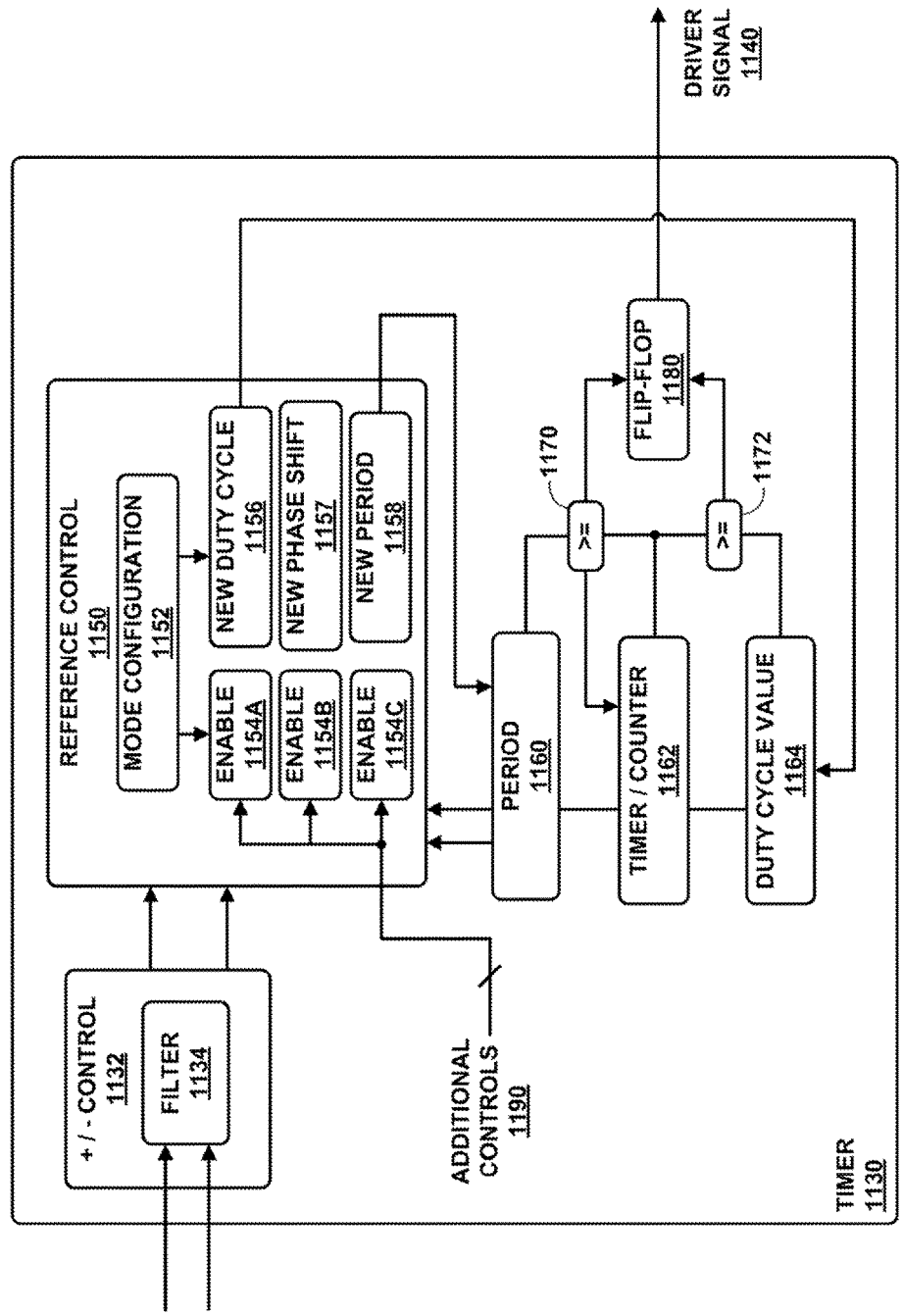
FIG. 11 is a conceptual block diagram of a timer configured to determine characteristics of a driver signal, in accordance with some examples of this disclosure.

FIG. 11 is a conceptual block diagram of a timer 1130 configured to determine characteristics of a driver signal 1140, in accordance with some examples of this disclosure. In some examples, timer 1132 may be configured to generate a control signal, and gate driver circuitry (not shown in FIG. 11) may be configured to generate driver signal 1140. In some examples, timer 1130 may cause integrated or external gate driver circuitry to generate driver signal 1140. Timer 1132 may include direction control module 1132, reference control module 1150, counter module 1162, and flip-flop 1180. Timer 1130 may be configured to receive and filter input signals at direction control module 1132 and filter 1134. Filter 1134 may remove high-frequency changes in the values of the input signals to avoid unwanted triggers due to noise.

Timer 1130 may also be configured to receive additional control signals 1190 to enable or disable the control of duty cycle, phase shift, and time period at modules 1154A-1154C and modules 1156-1158. Mode configuration module 1152 may be configured to determine whether each enable signal has an active value or an inactive value. If an enable signal has an inactive value, mode configuration module 1152 may be configured to hold constant the parameters of driver signal 1140, except that a CPU update may override the enable or disable signal to establish new parameters for driver signal 1140. Mode configuration module 1152 may be able to increment or decrement one or more of the parameters of driver signal 1140. It may be useful to change the time period for frequency modulation with a fixed on-time or fixed off-time. Reference control module 1150 may be configured to update the new values for timer/counter module 1162. Timer 1130 may also include a loop back from period module 1160 to provide the currently used values because the software of the CPU can update the parameter values for driver signal 1140.

Modules 1160, 1162, and 1164, along with comparators 1170 and 1172 may be configured to control the set and reset of flip-flop 1180 to start and end the on-time of driver signal 1140. Although not shown in FIG. 11, there may be gate driver circuitry configured to amplify the electrical power of the output of flip-flop 1180 in order to drive a power switch with high internal capacitance. Additional control signals 1190 may enable or disable the update of the parameters of driver signal 1140. In some examples, timer 1130 may be connected to an additional counter that provides enable signal(s) for a number (e.g., four) of automated updates and then wait for the CPU software to update the parameters. Additional control signals 1190 may also be used to control a stabilization time, such that there is a delay after an update from the CPU before additional control signals 1190 enable timer 1130 to change the parameters. For example, the parameters may remain constant for four switching cycles after a CPU update before timer 1130 changes the parameters.

Timer 1130 may be configured to control the on-time or the off-time of driver signal 1140 by starting a timer or counter at the beginning of the on-time or the off-time. Timer 1130 may be configured to stop the on-time or the off-time after a programmable duration. The programmable duration may be set by the CPU and/or reference control module 1150 and timer/control module 1162. Reference control module 1150 may be configured to change the parameters of driver signal 1140 by changing the programmable duration of the on-time and/or the programmable duration of the off-time. For example, the CPU may establish a programmable on-time duration of five microseconds and a programmable off-time duration of five microseconds for a frequency of one hundred kilohertz and a duty cycle of fifty percent. If an input signal indicates that the target signal is too low, timer 1130 may be configured to increase the programmable on-time duration and/or decrease the programmable off-time duration in order to increase the electrical power delivered to an electrical load.

Alternatively or in conjunction with a timer, the control circuitry may include a comparator for determining the parameters of a driver signal. For example, a comparator may receive a sawtooth wave or a triangle wave to compare with a reference voltage. Changing the reference voltage level may change the duty cycle of the output signal from the comparator. The control circuitry may set the reference voltage level based on a command from the CPU. The control circuitry may also be configured to change the reference voltage level based on whether an input signal has an active value.

Figure 12:
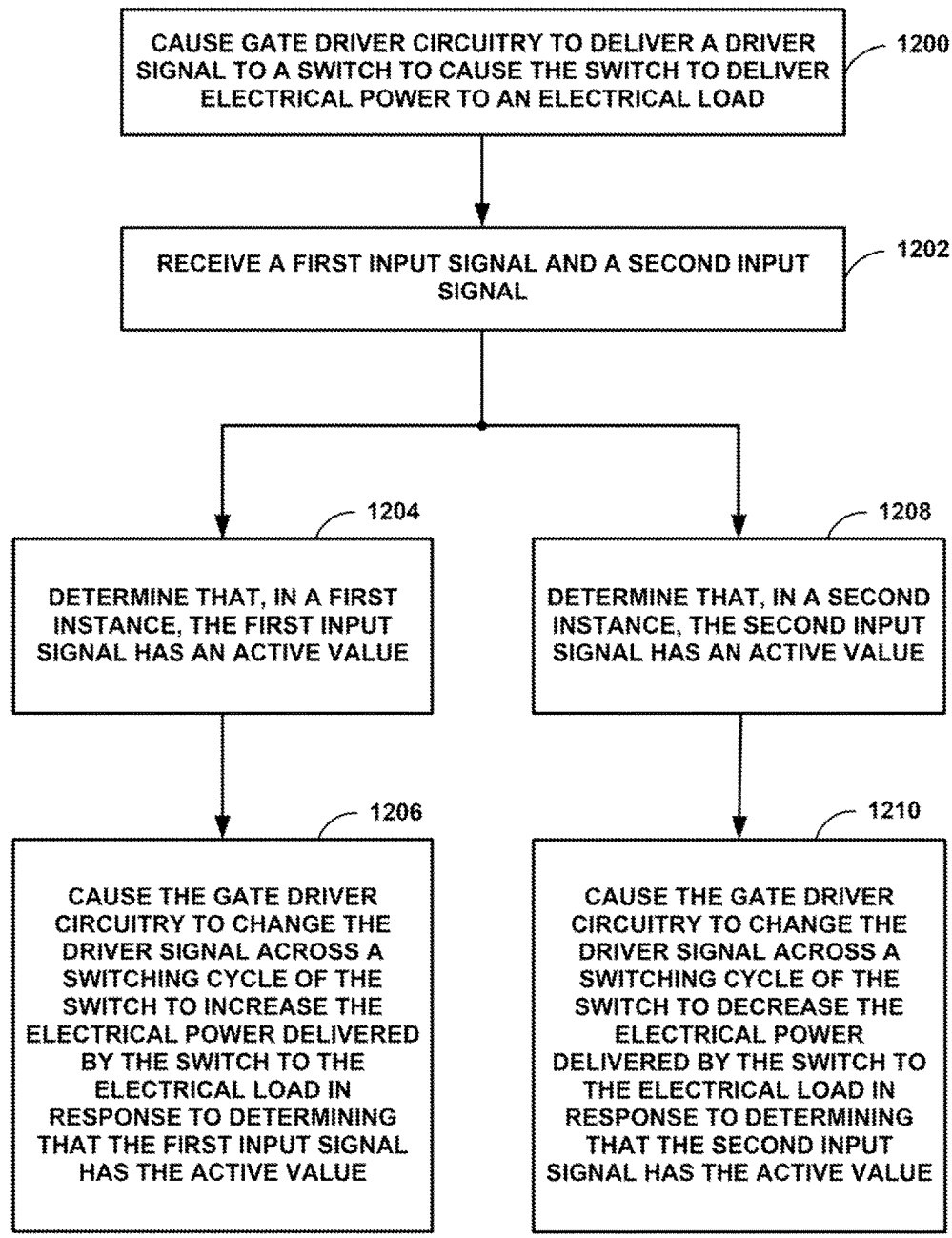
FIG. 12 is a flowchart illustrating techniques for generating a driver signal, in accordance with some examples of this disclosure.

FIG. 12 is a flowchart illustrating techniques for generating a driver signal, in accordance with some examples of this disclosure. The techniques of FIG. 12 are described with reference to device 100 in FIG. 1, although other components, such as devices 200 and 400 in FIGS. 2 and 4, may exemplify similar techniques.

In the example of FIG. 12, control circuitry 120 causes gate driver circuitry 130 to deliver driver signal 140 to switch 150 to cause switch 150 to deliver electrical power to an electrical load (1200). Gate driver circuitry 130 may be configured to generate driver signal 140 by amplifying a control signal received from control circuitry 120. Driver signal 140 may be a PWM signal with a fixed or variable frequency. The electrical power delivered by switch 150 may be based on the on-time, frequency, phase shift, and other parameters of driver signal 140.

In the example of FIG. 12, control circuitry 120 receives input signals 110A and 110B (1202). In the example of FIG. 12, in a first instance, control circuitry 120 determines that input signal 110A has an active value (1204). The active value of input signal 110A may indicate that the electrical power delivered to an electrical load is less than a lower threshold. Device 100 may include a comparator configured to compare a target signal to a threshold to cause one of input signals 110A and 110B to have an active value.

In the example of FIG. 12, in response to determining that input signal 110A has the active value, control circuitry 120 causes gate driver circuitry 130 to change driver signal 140 across a switching cycle to increase the electrical power delivered by switch 150 to the electrical load (1206). Control circuitry 120 may increase the electrical power delivered by switch 150 by increasing the on-time of driver signal 140. Control circuitry 120 may increase the on-time by increasing the duty cycle of driver signal 140 or by changing the phase shift of driver signal 140. Control circuitry 120 may also increase the electrical power delivered by switch 150 by increasing the frequency (i.e., decreasing the time period of a switching cycle) of driver signal 140.

In the example of FIG. 12, in a second instance, control circuitry 120 determines that input signal 110B has an active value (1208). In the example of FIG. 12, in response to determining that input signal 110B has the active value, control circuitry 120 causes gate driver circuitry 130 to change driver signal 140 across a switching cycle to decrease the electrical power delivered by switch 150 to the electrical load (1210).

In some examples, control circuitry 120 may be configured to increase or decrease a parameter of driver signal 140 across multiple switching cycles. For example, control circuitry 120 may be configured to increase the parameter by a constant increment or a constant decrement for one or more switching cycles. Control circuitry 120 may be configured to make this determination every switching cycle. The CPU of device 100 may be configured to re-determine the parameters of driver signal 140 less frequently (e.g., every fourth switching cycle or every tenth switching cycle). Thus, device 100 may include a less expensive CPU while having the ability to adjust to changes in the output power cycle-by-cycle.

The following numbered examples demonstrate one or more aspects of the disclosure.

Example 1

A device includes control circuitry configured to receive a first input signal, receive a second input signal, and cause gate driver circuitry to deliver a driver signal to a switch to cause the switch to deliver electrical power to an electrical load. The control circuitry is also configured to determine whether the first input signal has an active value and cause the gate driver circuitry to change the driver signal across a switching cycle of the switch to increase the electrical power delivered by the switch to the electrical load in response to determining that the first input signal has the active value. The control circuitry is further configured to determine whether the second input signal has the active value and cause the gate driver circuitry to change the driver signal across the switching cycle of the switch to decrease the electrical power delivered by the switch to the electrical load in response to determining that the second input signal has the active value.

Example 2

The device of example 1, wherein the control circuitry is configured to cause the gate driver circuitry to change the driver signal to increase the electrical power delivered by the switch by at least causing the gate driver circuitry to increase an on-time of the driver signal. The control circuitry is also configured to cause the gate driver circuitry to change the driver signal to decrease the electrical power delivered by the switch by at least causing the gate driver circuitry to decrease the on-time of the driver signal.

Example 3

The device of examples 1-2 or any combination thereof, wherein the control circuitry is configured to increase the on-time of the driver signal by at least increasing the on-time of the driver signal by a constant increment for each switching cycle of two or more switching cycles. The control circuitry is also configured to decrease the on-time of the driver signal by at least decreasing the on-time of the driver signal by a constant decrement for each switching cycle of the two or more switching cycles.

Example 4

The device of examples 1-3 or any combination thereof, wherein the control circuitry is configured to cause the gate driver circuitry to change the driver signal to increase the electrical power delivered by the switch by at least increasing a duty cycle of the driver signal. The control circuitry is also configured to cause the gate driver circuitry to change the driver signal to decrease the electrical power delivered by the switch by at least decreasing the duty cycle of the driver signal.

Example 5

The device of examples 1-4 or any combination thereof, wherein the control circuitry is configured to increase the duty cycle of the driver signal by at least increasing the duty cycle of the driver signal by a constant increment for each switching cycle of two or more switching cycles. The control circuitry is also configured to decrease the duty cycle of the driver signal by at least decreasing the duty cycle of the driver signal by a constant decrement for each switching cycle of the two or more switching cycles.

Example 6

The device of examples 1-5 or any combination thereof, wherein the control circuitry is configured to cause the gate driver circuitry to change the driver signal to increase the electrical power delivered by the switch by at least increasing a frequency of the driver signal. The control circuitry is also configured to cause the gate driver circuitry to change the driver signal to decrease the electrical power delivered by the switch by at least decreasing the frequency of the driver signal.

Example 7

The device of examples 1-6 or any combination thereof, wherein the control circuitry is configured to increase the frequency of the driver signal by at least increasing the frequency of the driver signal by a constant increment for each switching cycle of two or more switching cycles. The control circuitry is also configured to decrease the frequency of the driver signal by at least decreasing the frequency of the driver signal by a constant decrement for each switching cycle of the two or more switching cycles.

Example 8

The device of examples 1-7 or any combination thereof, wherein the control circuitry is further configured to receive an enable signal, determine that the enable signal has an active value or an inactive value, and cause the gate driver circuitry to deliver the driver signal to hold constant the electrical power delivered by the switch in response to determining that the enable signal has the inactive value.

Example 9

The device of examples 1-8 or any combination thereof, wherein the control circuitry is further configured to determine an on-time of a first driver signal across a first switching cycle of two or more switching cycles. The control circuitry is also configured to cause the gate driver circuitry to change the first driver signal to increase the electrical power delivered by the switch to the electrical load in response to at least determining that an on-time of a second driver signal across a second switching cycle of the two or more switching cycles is longer than the on-time of the first driver signal across the first switching cycle. The control circuitry is further configured to cause the gate driver circuitry to change the first driver signal to decrease the electrical power delivered by the switch to the electrical load in response to at least determining that the on-time of the second driver signal across the second switching cycle is shorter than the on-time of the first driver signal across the first switching cycle.

Example 10

The device of examples 1-9 or any combination thereof, wherein the control circuitry is configured to determine that the first input signal has the active value by at least determining that the first input signal has the active value for at least a threshold duration. The control circuitry is also configured to determine that the second input signal has the active value by at least determining that the second input signal has the active value for at least the threshold duration.

Example 11

The device of examples 1-10 or any combination thereof, wherein the control circuitry includes timer circuitry configured to start an on-time of the driver signal and stop the on-time after a programmable duration. The control circuitry is configured to cause the gate driver circuitry to change the driver signal to increase the electrical power delivered by the switch by at least increasing the programmable duration. The control circuitry is also configured to cause the gate driver circuitry to change the driver signal to decrease the electrical power delivered by the switch by at least decreasing the programmable duration.

Example 12

The device of examples 1-11 or any combination thereof, wherein the control circuitry is configured to cause the gate driver circuitry to change the driver signal to increase the electrical power delivered by the switch by at least causing the gate driver circuitry to decrease a phase shift of the driver signal. The control circuitry is also configured to cause the gate driver circuitry to change the driver signal to decrease the electrical power delivered by the switch by at least causing the gate driver circuitry to increase the phase shift of the driver signal.

Example 13

The device of examples 1-12 or any combination thereof, wherein the control circuitry is configured to increase the phase shift of the driver signal by at least increasing the phase shift of the driver signal by a constant increment for each switching cycle of two or more switching cycles. The control circuitry is also configured to decrease the phase shift of the driver signal by at least decreasing the phase shift of the driver signal by a constant decrement for each switching cycle of the two or more switching cycles.

Example 14

The device of examples 1-13 or any combination thereof, wherein the control circuitry is configured to cause the gate driver circuitry to change the driver signal to increase the electrical power delivered by the switch by at least causing the gate driver circuitry to decrease an off-time of the driver signal. The control circuitry is also configured to cause the gate driver circuitry to change the driver signal to decrease the electrical power delivered by the switch by at least causing the gate driver circuitry to increase the off-time of the driver signal.

Example 15

A method includes receiving a first input signal, receiving a second input signal, and causing gate driver circuitry to deliver a driver signal to a switch to cause the switch to deliver electrical power to an electrical load. The method further includes determining that, in a first instance, the first input signal has an active value and changing the driver signal across a switching cycle of the switch to increase the electrical power delivered by the switch to the electrical load in response to determining that the first input signal has the active value. The method also includes determining that, in a second instance, the second input signal has the active value and changing the driver signal across the switching cycle of the switch to decrease the electrical power delivered by the switch to the electrical load in response to determining that the second input signal has the active value.

Example 16

The method of example 15, wherein changing the driver signal to increase the electrical power delivered by the switch includes increasing an on-time of the driver signal for each switching cycle of two or more switching cycles, and changing the driver signal to decrease the electrical power delivered by the switch includes decreasing the on-time of the driver signal for each switching cycle of the two or more switching cycles.

Example 17

The method of examples 15-16 or any combination thereof, wherein changing the driver signal to increase the electrical power delivered by the switch includes increasing a duty cycle of the driver signal for each switching cycle of two or more switching cycles, and changing the driver signal to decrease the electrical power delivered by the switch includes decreasing the duty cycle of the driver signal for each switching cycle of the two or more switching cycles.

Example 18

The method of examples 15-17 or any combination thereof, wherein changing the driver signal to increase the electrical power delivered by the switch includes increasing a frequency of the driver signal for each switching cycle of two or more switching cycles, and changing the driver signal to decrease the electrical power delivered by the switch includes decreasing the frequency of the driver signal for each switching cycle of the two or more switching cycles.

Example 19

The method of examples 15-18 or any combination thereof, wherein changing the driver signal to increase the electrical power delivered by the switch includes decreasing a phase shift of the driver signal for each switching cycle of two or more switching cycles, and changing the driver signal to decrease the electrical power delivered by the switch includes increasing the phase shift of the driver signal for each switching cycle of the two or more switching cycles.

Example 20

A system includes a switch configured to deliver electrical power to an electrical load and gate driver circuitry configured to deliver a driver signal to a control terminal of the switch to cause the switch to deliver the electrical power to the electrical load. The system also includes control circuitry configured to receive a first input signal, receive a second input signal, and determine whether the first input signal has an active value. The control circuitry is also configured to cause the gate driver circuitry to change the driver signal across a switching cycle of the switch to increase the electrical power delivered by the switch to the electrical load in response to determining that the first input signal has the active value. The control circuitry is further configured to determine whether the second input signal has the active value and cause the gate driver circuitry to change the driver signal across the switching cycle of the switch to decrease the electrical power delivered by the switch to the electrical load in response to determining that the second input signal has the active value.

Various examples of the disclosure have been described. Any combination of the described systems, operations, or functions is contemplated. These and other examples are within the scope of the following claims.

What is claimed is:
1. A device comprising:
control circuitry configured to:
 receive a first input signal;
 receive a second input signal;
 cause gate driver circuitry to deliver a driver signal to a switch to cause the switch to deliver electrical power to an electrical load;
 determine whether the first input signal has an active value;
 cause the gate driver circuitry to change the driver signal across a switching cycle of the switch to increase the electrical power delivered by the switch to the electrical load in response to determining that the first input signal has the active value;
 determine whether the second input signal has the active value; and cause the gate driver circuitry to change the driver signal across the switching cycle of the switch to decrease the electrical power delivered by the switch to the electrical load in response to determining that the second input signal has the active value.

2. The device of claim 1,
wherein the control circuitry is configured to cause the gate driver circuitry to change the driver signal to increase the electrical power delivered by the switch by at least causing the gate driver circuitry to increase an on-time of the driver signal, and
wherein the control circuitry is configured to cause the gate driver circuitry to change the driver signal to decrease the electrical power delivered by the switch by at least causing the gate driver circuitry to decrease the on-time of the driver signal.

3. The device of claim 2,
wherein the control circuitry is configured to increase the on-time of the driver signal by at least increasing the on-time of the driver signal by a constant increment for each switching cycle of two or more switching cycles, and
wherein the control circuitry is configured to decrease the on-time of the driver signal by at least decreasing the on-time of the driver signal by a constant decrement for each switching cycle of the two or more switching cycles.

4. The device of claim 1,
wherein the control circuitry is configured to cause the gate driver circuitry to change the driver signal to increase the electrical power delivered by the switch by at least increasing a duty cycle of the driver signal, and
wherein the control circuitry is configured to cause the gate driver circuitry to change the driver signal to decrease the electrical power delivered by the switch by at least decreasing the duty cycle of the driver signal.

5. The device of claim 4,
wherein the control circuitry is configured to increase the duty cycle of the driver signal by at least increasing the duty cycle of the driver signal by a constant increment for each switching cycle of two or more switching cycles, and
wherein the control circuitry is configured to decrease the duty cycle of the driver signal by at least decreasing the duty cycle of the driver signal by a constant decrement for each switching cycle of the two or more switching cycles.

6. The device of claim 1,
wherein the control circuitry is configured to cause the gate driver circuitry to change the driver signal to increase the electrical power delivered by the switch by at least increasing a frequency of the driver signal, and
wherein the control circuitry is configured to cause the gate driver circuitry to change the driver signal to decrease the electrical power delivered by the switch by at least decreasing the frequency of the driver signal.

7. The device of claim 6,
wherein the control circuitry is configured to increase the frequency of the driver signal by at least increasing the frequency of the driver signal by a constant increment for each switching cycle of two or more switching cycles, and
wherein the control circuitry is configured to decrease the frequency of the driver signal by at least decreasing the frequency of the driver signal by a constant decrement for each switching cycle of the two or more switching cycles.

8. The device of claim 1, wherein the control circuitry is further configured to:
receive an enable signal;
determine that the enable signal has an active value or an inactive value; and
cause the gate driver circuitry to deliver the driver signal to hold constant the electrical power delivered by the switch in response to determining that the enable signal has the inactive value.

9. The device of claim 1,
wherein the control circuitry is further configured to determine an on-time of a first driver signal across a first switching cycle of two or more switching cycles,
wherein the control circuitry is configured to cause the gate driver circuitry to change the first driver signal to increase the electrical power delivered by the switch to the electrical load in response to at least determining that an on-time of a second driver signal across a second switching cycle of the two or more switching cycles is longer than the on-time of the first driver signal across the first switching cycle, and
wherein the control circuitry is configured to cause the gate driver circuitry to change the first driver signal to decrease the electrical power delivered by the switch to the electrical load in response to at least determining that the on-time of the second driver signal across the second switching cycle is shorter than the on-time of the first driver signal across the first switching cycle.

10. The device of claim 1,
wherein the control circuitry is configured to determine that the first input signal has the active value by at least determining that the first input signal has the active value for at least a threshold duration, and
wherein the control circuitry is configured to determine that the second input signal has the active value by at least determining that the second input signal has the active value for at least the threshold duration.

11. The device of claim 1, wherein the control circuitry comprises timer circuitry configured to:
start an on-time of the driver signal;
stop the on-time after a programmable duration;
wherein the control circuitry is configured to cause the gate driver circuitry to change the driver signal to increase the electrical power delivered by the switch by at least increasing the programmable duration, and
wherein the control circuitry is configured to cause the gate driver circuitry to change the driver signal to decrease the electrical power delivered by the switch by at least decreasing the programmable duration.

12. The device of claim 1,
wherein the control circuitry is configured to cause the gate driver circuitry to change the driver signal to increase the electrical power delivered by the switch by at least causing the gate driver circuitry to decrease a phase shift of the driver signal, and
wherein the control circuitry is configured to cause the gate driver circuitry to change the driver signal to decrease the electrical power delivered by the switch by at least causing the gate driver circuitry to increase the phase shift of the driver signal.

13. The device of claim 12,
wherein the control circuitry is configured to increase the phase shift of the driver signal by at least increasing the phase shift of the driver signal by a constant increment for each switching cycle of two or more switching cycles, and wherein the control circuitry is configured to decrease the phase shift of the driver signal by at least decreasing the phase shift of the driver signal by a constant decrement for each switching cycle of the two or more switching cycles.

14. The device of claim 1,
wherein the control circuitry is configured to cause the gate driver circuitry to change the driver signal to increase the electrical power delivered by the switch by at least causing the gate driver circuitry to decrease an off-time of the driver signal, and
wherein the control circuitry is configured to cause the gate driver circuitry to change the driver signal to decrease the electrical power delivered by the switch by at least causing the gate driver circuitry to increase the off-time of the driver signal.

15. A method comprising:
receiving a first input signal;
receiving a second input signal;
causing gate driver circuitry to deliver a driver signal to a switch to cause the switch to deliver electrical power to an electrical load;
determining that, in a first instance, the first input signal has an active value;
changing the driver signal across a switching cycle of the switch to increase the electrical power delivered by the switch to the electrical load in response to determining that the first input signal has the active value;
determining that, in a second instance, the second input signal has the active value; and
changing the driver signal across the switching cycle of the switch to decrease the electrical power delivered by the switch to the electrical load in response to determining that the second input signal has the active value.

16. The method of claim 15,
wherein changing the driver signal to increase the electrical power delivered by the switch comprises increasing an on-time of the driver signal for each switching cycle of two or more switching cycles, and
wherein changing the driver signal to decrease the electrical power delivered by the switch comprises decreasing the on-time of the driver signal for each switching cycle of the two or more switching cycles.

17. The method of claim 15,
wherein changing the driver signal to increase the electrical power delivered by the switch comprises increasing a duty cycle of the driver signal for each switching cycle of two or more switching cycles, and
wherein changing the driver signal to decrease the electrical power delivered by the switch comprises decreasing the duty cycle of the driver signal for each switching cycle of the two or more switching cycles.

18. The method of claim 15,
wherein changing the driver signal to increase the electrical power delivered by the switch comprises increasing a frequency of the driver signal for each switching cycle of two or more switching cycles, and
wherein changing the driver signal to decrease the electrical power delivered by the switch comprises decreasing the frequency of the driver signal for each switching cycle of the two or more switching cycles.

19. The method of claim 15,
wherein changing the driver signal to increase the electrical power delivered by the switch comprises decreasing a phase shift of the driver signal for each switching cycle of two or more switching cycles, and
wherein changing the driver signal to decrease the electrical power delivered by the switch comprises increasing the phase shift of the driver signal for each switching cycle of the two or more switching cycles.

20. A system comprising:
a switch configured to deliver electrical power to an electrical load;
gate driver circuitry configured to deliver a driver signal to a control terminal of the switch to cause the switch to deliver the electrical power to the electrical load; and
control circuitry configured to:
receive a first input signal;
receive a second input signal;
determine whether the first input signal has an active value;
cause the gate driver circuitry to change the driver signal across a switching cycle of the switch to increase the electrical power delivered by the switch to the electrical load in response to determining that the first input signal has the active value;
determine whether the second input signal has the active value; and
cause the gate driver circuitry to change the driver signal across the switching cycle of the switch to decrease the electrical power delivered by the switch to the electrical load in response to determining that the second input signal has the active value.

* * * * *